Figure 3:
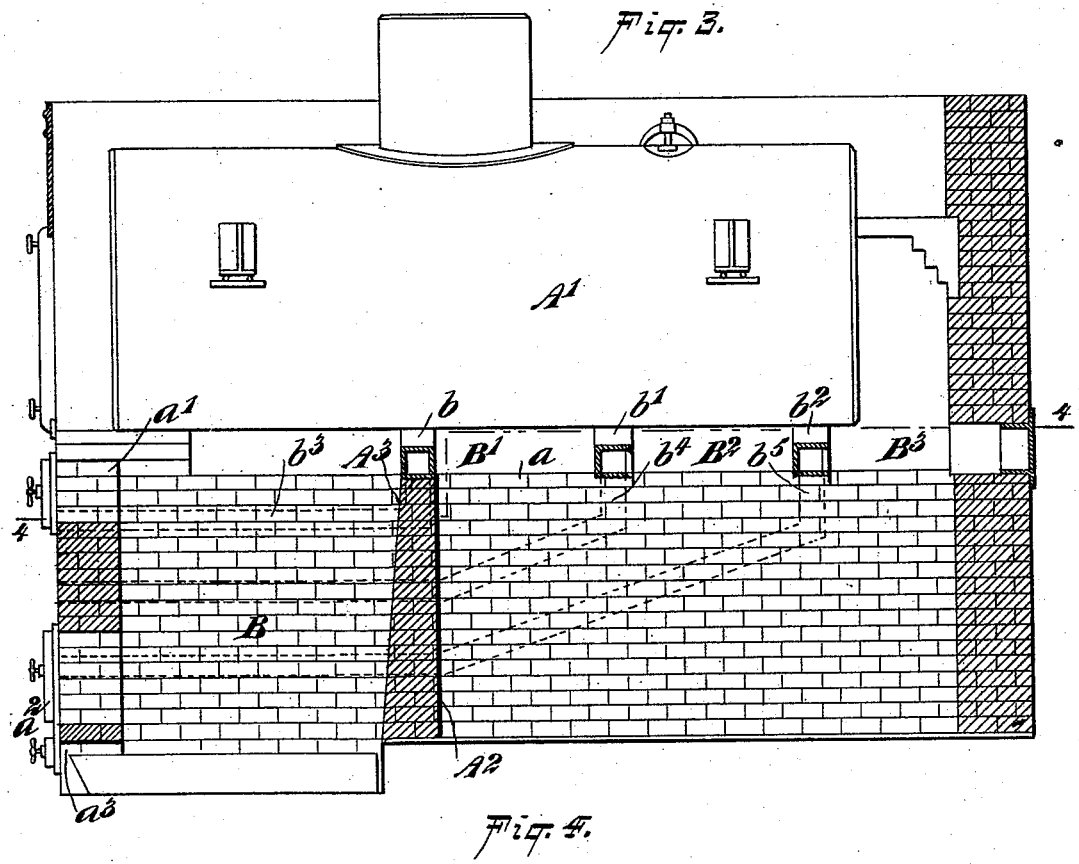

(No Model.)  2 Sheets—Sheet 1.
D. D. FLEMMING.
BOILER FURNACE.
No. 572,417. Patented Dec. 1, 1896.
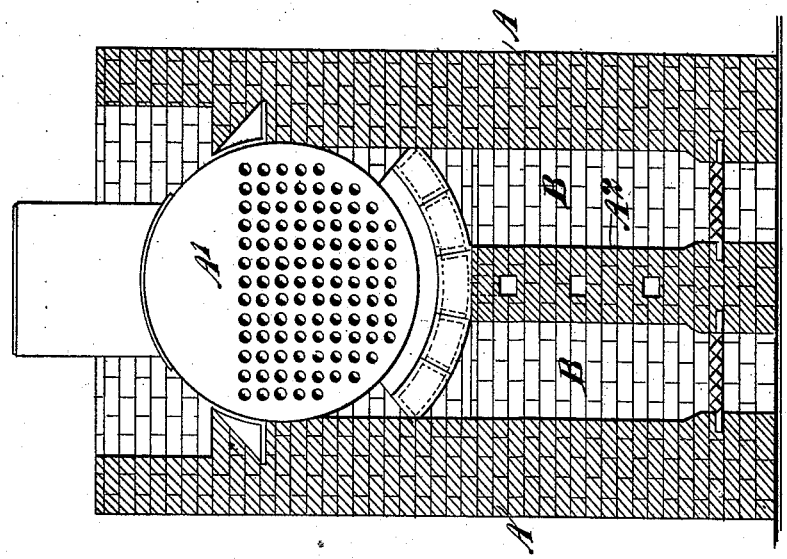
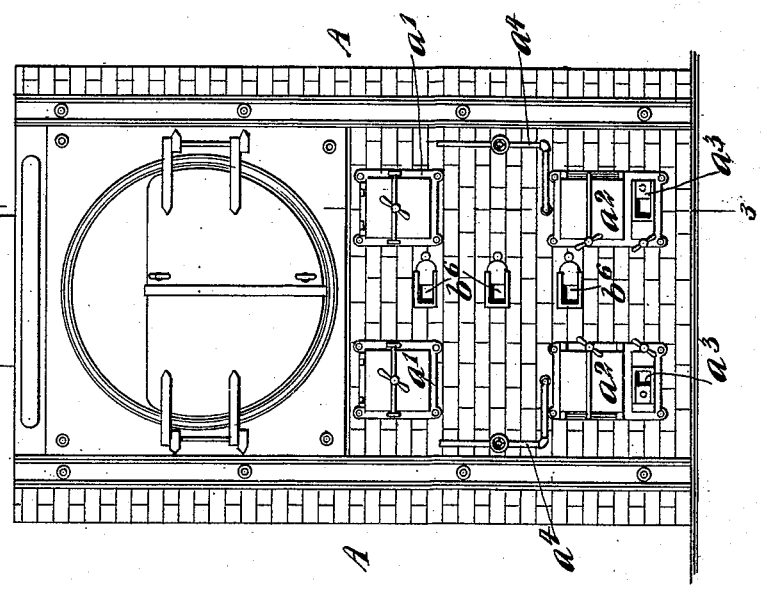
WITNESSES:
INVENTOR
D. D. Flemming
BY
ATTORNEYS (No Model.) 2 Sheets—Sheet 2.

D. D. FLEMMING.
BOILER FURNACE.

No. 572,417. Patented Dec. 1, 1896.

WITNESSES:
William L. Goebel.
C. R. Ferguson

INVENTOR
D. D. Flemming
BY
ATTORNEYS

UNITED STATES PATENT OFFICE.

DUDLEY D. FLEMMING, OF JERSEY CITY, NEW JERSEY.

BOILER-FURNACE.

SPECIFICATION forming part of Letters Patent No. 572,417, dated December 1, 1896.

Application filed January 2, 1896. Serial No. 574,061. (No model.)

*To all whom it may concern:*

Be it known that I, DUDLEY D. FLEMMING, of Jersey City, in the county of Hudson and State of New Jersey, have invented new and useful Improvements in Boiler-Furnaces, of which the following is a full, clear, and exact description.

This invention relates to an improvement in the construction and arrangement of furnaces for heating steam-boilers, and has for its objects greater economy in the combustion of fuel, and a more thorough distribution of the resulting heat, and a less laborious system of the furnace-stoking than that now in use.

In the steam-boilers as now used the system practiced in firing them is to charge the fuel in the fire-box to a depth of from six to twelve inches. This is distributed over a comparatively large area of grate-surface, and the result is that owing to the slight resistance or impediment of the passage of the air through the incandescent fuel the ultimate of combustion or carbonic-acid gas is instantly reached, and the only useful effect realized in generating the steam is the surplus heat which this gas parts with in its passage through the tubes to the off-take chimney, which is but a small percentage of the energy possessed by the fuel.

In my furnace, by a properly-regulated primary-air supply and the combination therewith of water-vapor, I produce the combustible gases hydrogen and carbonic oxid, which at intervals in properly-constructed combustion-chambers are subjected to contact with a regulated secondary supply of air, which converts them, respectively, to water and carbonic-acid gas, and this reaction is continued to the point of escape in the chimney. I am thus enabled to more thoroughly absorb and economize the energy of the fuel. To produce these reactions, it is necessary to have a furnace of sufficient capacity to contain a large mass in depth of fuel and of sufficient volume to maintain a slower generation of the gases. With this end in view I construct my furnace of large proportions, so as to contain many times the volume of the fuel as now used and also to reduce the grate area. To maintain an uninterrupted volume of heat, it is necessary to construct the furnace with a series of sections operating in conjunction, so that they may be alternately charged or cleaned, and also to always maintain sufficient heat to ignite the gases when they are subjected to contact with the secondary-air supply or when bituminous coal is used as fuel to consume the carbon vapor or smoke.

I will describe a furnace embodying my invention and then point out the novel features in the appended claim.

Reference is to be had to the accompanying drawings, forming a part of this specification, in which similar characters of reference indicate corresponding parts in all the views.

Figure 4:
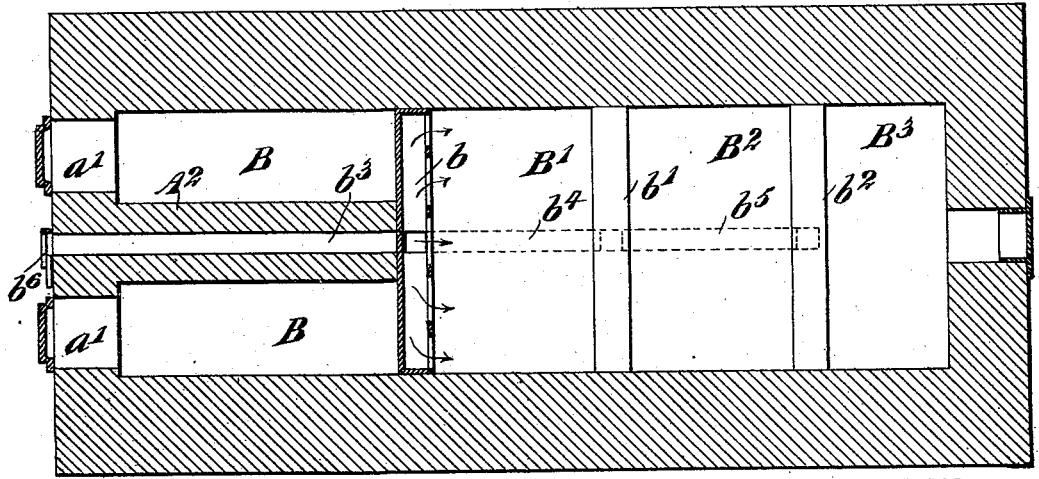

Figure 1 is an end elevation of a furnace embodying my invention. Fig. 2 is a vertical section thereof. Fig. 3 is a longitudinal section on the line 3 3 of Fig. 1, and Fig. 4 is a horizontal section on the line 4 4 of Fig. 3.

Referring to the drawings, A designates the outer walls or brickwork of the furnace, in the upper portion of which is supported a tubular boiler A'. Extended longitudinally between the outer walls A is a partition $A^2$, and arranged transversely near the front end is a bridge-wall $A^3$, thus forming the two chambers B B of the furnace. These chambers open into a flame-bed $a$ beneath the boiler A'. Through the front wall each chamber of the furnace is provided with a charging-opening $a'$, closed by a door, and also with doors $a^2$, leading to the furnace and also to the ash-pit. Below these doors $a^2$ are valve-openings $a^3$ for the purpose of regulating the admission of primary air below the grate-bars. It will be seen that these furnace-chambers are of much greater height and length than width, thus providing for a considerable depth of fuel on a very small grate-surface area.

Leading into each chamber of the furnace is a valve-regulated pipe $a^4$ for supplying either steam or water, which is allowed to trickle down on the fuel mass in the furnace for the purpose of supplying the necessary water-vapor.

The flame-bed $a$ is divided into a series of combustion-chambers. As here shown, there are three of these combustion-chambers B' $B^2$ $B^3$. At the front end of the combustion-chamber B' and arranged transversely over the flame-bed is an air-supply hood $b$, and similar hoods $b'$ $b^2$ are provided for the combustion-chambers $B^2$ $B^3$. These hoods communicate, respectively, with the outer air through ducts $b^3$, $b^4$, and $b^5$, which extend through the partition $A^2$ and have valved openings $b^6$ through the front wall of the furnace. These several ducts and hoods are designed to supply the secondary air.

In the operation of the furnace the fuel is charged so as to completely fill the chambers to the height of the connecting-opening over the partition-wall, and when thoroughly ignited the valves for the admission of the primary air are so adjusted as to admit only sufficient air to form carbonic-oxid gas. The steam or water is also admitted and becoming vaporized passes up through the incandescent mass of the fuel and is decomposed. These resulting gases pass from this generating-chamber into the first combustion-chamber $B'$, where they partially combine with the secondary air which is admitted through and regulated by the secondary-air valve for the duct $b^3$. From this chamber they pass to the second and third combustion-chambers, where the same process is repeated, each chamber being provided with and regulated by its own secondary-air duct. At this point the combustion is completed, and the resulting carbonic-acid gas being highly heated passes into and through the return-tubes to the off-take chimney, gradually parting with its heat as it moves along.

Owing to the large cubical capacity of the furnace, there is a complete control over the combustion of the fuel and the formation of slag is obviated, and I have found that the furnace may be worked for twenty-four hours or more without attention except the necessary charging with the fuel. Thus the labor required to operate the furnace is very much reduced in comparison with the present system.

Having thus described my invention, I claim as new and desire to secure by Letters Patent—

A furnace for a steam-boiler, comprising a series of chambers communicating one with another above a separating-partition, each chamber having a greater height than width, means for admitting primary air to each chamber consisting of valve-controlled openings through a wall of the furnace below the grate-bars in the chambers, valve-controlled pipes leading into the chambers, a flame-bed divided into a number of combustion-chambers, and a hood extended transversely over the flame-bed at the front end of each combustion-chamber, each of said hoods having communication with the outer atmosphere through valve-controlled ducts in the partition-wall, substantially as specified.

DUDLEY D. FLEMMING.

Witnesses:
THOMAS J. KENNEDY,
WILLIAM PERDUE.